United States Patent [19]

Meny et al.

[11] 4,270,933

[45] * Jun. 2, 1981

[54] REGENERATIVE, FLUID FILTER

[76] Inventors: Allan H. Meny, 1 Hoover St., North Arlington, N.J. 07032; Dennis L. Palmer, 61 Douglas Dr., Towaco, N.J. 07082

[*] Notice: The portion of the term of this patent subsequent to Oct. 14, 1997, has been disclaimed.

[21] Appl. No.: 131,703

[22] Filed: Mar. 19, 1980

[51] Int. Cl.³ .............................................. B01D 39/16
[52] U.S. Cl. ........................................ 55/279; 55/524
[58] Field of Search ................. 55/279, 360, 524, 527, 55/528; 210/506–509; 131/267; 428/283, 290; 260/42.46

[56] References Cited

U.S. PATENT DOCUMENTS

| | | | |
|---|---|---|---|
| Re. 29,410 | 9/1977 | Yoshino | 55/524 |
| 2,430,861 | 11/1947 | Carpenter et al. | 55/524 |
| 2,527,628 | 10/1950 | Francis, Jr. | 55/524 |
| 2,566,960 | 9/1951 | Phillips | 55/524 |
| 2,785,090 | 3/1957 | Kirk, Jr. | 55/524 |
| 2,839,158 | 6/1958 | Reinauer | 55/524 |
| 2,871,977 | 2/1959 | Kling | 55/524 |
| 2,932,362 | 4/1960 | Roper | 55/524 |
| 3,015,367 | 1/1962 | Smith et al. | 131/267 |
| 3,320,961 | 5/1967 | Hughes et al. | 131/267 |
| 3,594,993 | 7/1971 | Heyse | 55/524 |
| 3,755,519 | 8/1973 | Myers et al. | 260/42.46 |
| 4,097,656 | 6/1978 | Dany et al. | 260/42.46 |

FOREIGN PATENT DOCUMENTS

| | | | |
|---|---|---|---|
| 247368 | 1/1963 | Australia | 260/42.46 |
| 46-109573 | 9/1971 | Japan | 55/524 |
| 50-109372 | 3/1975 | Japan | 428/290 |
| 966854 | 8/1964 | United Kingdom | 55/524 |

*Primary Examiner*—David L. Lacey
*Attorney, Agent, or Firm*—Thomas N. Neiman

[57] ABSTRACT

The novel filter, according to an embodiment thereof, comprises a filter matrix formed into a specific geometry and made of glass, metal, mineral and/or cellulostic fibers, fibers or fiber-agglomerates molded from thermoplastic, thermoset plastics, elastoplasts, or related synthetic polymer materials, or natural fibers, such as cotton, wool, and the like, which have been coated, impregnated, or compounded, prior to forming, with a series of substances in order that the filter may be easily cleaned and reused, as well as protected against corrosive action by the fluid media, or to render substances in the filtration fluid media, or to render substances in the filtration media chemically unreactive, or to change the chemical state or structure of matter in the fluid media. The coating compounds, filler compounds, or impregnants, depending upon which thereof are employed, change the physical properties of the filter matrix and alters impaction-retention of the filtered particles, and/or alters the electro-static attraction of the matrix for matter in the fluid media, and/or imparts corrosion protection to the filter matrix, and/or renders matter in the fluid media chemically unreactive by changing its reactivity characteristics or chemical structure upon contact with the matrix.

9 Claims, No Drawings

REGENERATIVE, FLUID FILTER

This invention pertains to fluid filters for removing components such as particulate matter from gas streams, and in particular to an improved fluid filter which is readily regenerative, and which comprises means for gettering carcinogenic and like harmful vapors and/or particulates.

Fluid filters well known in the prior art are quite efficient in removing components such as particulate materials, particulate-aerosol combinants, sublimated solids, vapors, bacteria and virus, some real gases, and the like, from gas streams. However, the known filters, as they are more efficient are more expensive, and exceedingly difficult to clean for reuse. Typically, the more efficient the filter, the less regenerative it is and, of course, this presents a marked cost burden.

It is an object of this invention to set forth an improved, regenerative fluid filter which, nonetheless, suffers no loss of efficiency.

It is particularly an object of this invention to set forth an improved, regenerative fluid filter, for removing components such as sublimated solids, particulate materials, particulate-aerosol combinants, and the like, from gas streams, said filter having a matrix formed from at least one material taken from a group of materials consisting of treated paper, glass, metal, mineral and cellulostic fibers, fibers or fiber-agglomerates molded from thermoplastic, thermoset plastics, elastoplasts and related synthethic polymer materials, ceramic fibers, mineral fibers, and natural fibers such as cotton, wool, and the like, wherein the improvement comprises at least one means mated to said matrix material for hardening, strengthening, and toughening said matric material, for enhancing components-release from said filter, whereby said filter is rendered readily regenerative; wherein the said means mated to said matrix comprises a coating and a filler agent.

It is another object of this invention to set forth an improved, regenerative fluid filter of the type aforesaid, whereby said filter, upon having been cleaned pursuant to a blinded condition thereof, manifests a change in pressure drop across the filter face which manifests restoration to fifty percent of the used or blinded condition pressure drop. For example, if the filter has a pressure drop of 1.5 inches of water at 1000 cfm of air across a filter with a face area of 500 in.$^2$ and, with use, develops a pressure drop of 5 to 15 inches of water at the same condition and blinds, the filter should have to be cleaned to fifty percent of the blinded condition pressure drop, i.e. 2.5 or 7.5 inches of water, for the filter to be considered as having been rendered reusable. It is the aforesaid object of this invention, then, to disclose an improved, regenerative fluid filter which meets such criterion.

It is another object of this invention to disclose an improved, regenerative fluid filter, of the type noted, in which said mated means further comprises means for selectively altering physical properties of said matrix material to reduce impaction-retention of said stream components captured by said matrix material, while rendering said filter easily and non-destructively cleanable and reusable, while maintaining filtration efficiency thereof.

It is another object of this invention to set forth an improved, regenerative fluid filter of the type noted, in which said mated means further comprises: means for reducing electro-static attraction of said matrix material for stream components captured by said matrix material; means for increasing diffusion capacity of said matrix material; means for protecting said matrix material from corrosive action of said stream components, or from damage arising from gross impingement, abrasion or erosion; and means for rendering said stream components unreactive, non-carcinogenic, or likewise chemically stable and/or harmless, due to reaction of said components with said mated means, wherein said mated means comprises means for functioning as a gettering agent, and wherein said mated means comprises means for altering the chemical structure or chemical state, functionality, or reactivity of the stream components.

Further objects of this invention, as well as the novel features thereof, will become more apparent by reference to the following description.

Fluid filters, in general, and especially the more efficient thereof, which have extremely high retention characteristics, and which are possessed of the ability and function to remove the very smallest particles and the like from gas streams, manifest both impaction and diffusion. In impaction, the to-be-filtered-out components collide with filter matrix fibers and are held—particularly because the fiber surfaces are relatively light and soft, and they readily accept the components. In diffusion, the components in the gas stream migrate from a region of high component concentration to the regions of lower concentrations, and "diffuse" from the latter to the former to accumulate on the fibers. Now, this phenomena, taken with the electro-static attraction of the fibers for the components, causes the components to cling tenaciously to the fibers. The impaction-retained components tend to be the larger thereof, whereas the diffused and electro-statically-held components are typically the smaller.

As noted previously, to effect release of the captured or entrapped components, it is the customary practice to add mechanical energy to the filter system. To release the components, a sufficient amount of energy must be added to overcome the combined impaction-retention/diffusion/electro-static forces. Untreated filters must be energized with mechanical forces that will exceed the strength of the fibers of the matrix, or the fiber-agglomerates, and the filter itself, causing destruction of the filter system. This being the state-of-the-art condition for filter systems, it is our invention to coat, formulate constituents into, or impregnate the filter matrix material with one or more materials which impart singular component release favorably alter the physical properties of the matrix material fibers, positively control the electro-static forces of attraction for the gas stream components, and accomodate the egress of captured components by providing accessible apertures or paths from where stream components can be easily removed. In addition, the coating materials, formulated constituents, or impregnants can simultaneously provide corrosion protection to the filter matrix material to render the gas stream components harmless, or simultaneously getter certain carcinogenics or chemically unstable substances by altering their chemical reactivity or by changing their chemical structure.

According to one embodiment of the invention, a coating material comprising a mixture of graphitic powders of varying particle-size distributions in various thermoplastic and thermoset plastic matrix systems is used. This material is available commercially, under the name EPIS coating, from Epis Corporation, 70 Oakwood Drive, Glastonbury, Conn. 06033. The coating is pressure sprayed onto one side of the filter media or matrix and drawn by vacuum on the side opposite. The coating is then allowed to reside in the filter matrix, with the spray turned off and with the vacuum on, for a period of time ranging from one to sixteen hours. The coating may be annealed or sintered after the aforesaid fluidizing treatment. According to one of our curing techniques, the matrix is air dried with 250° F. air venting to the atmosphere, for from one to ten hours. Next, the heat is raised to 450° F., this being held for from one to sixteen hours. Finally, the filter matrix is allowed to cool to room temperature. The coating finishes as a homogeneous, hard film on the fibers of the filter matrix of from 10 to 1000 microns thickness, approximately.

The foregoing treatment reduces the resistivity of the filter matrix media from $10^{-10}$ to $10^{-13}$ ohm-cm (dry) to $10^{-4}$ to $10^{-1}$ ohm-cm depending on the composition of the coating and the thickness thereof. Coatings of this type, when formulated and applied as noted, also impart unusual corrosion resistance to the filter media because of the coating's ability to resist oxidation attack, organic-vapor solvent stress, corrosion cracking, caustic attack, inorganic gaseous attack, or solvation/dissolution attack from chlorinated hydrocarbons, or halogenated acids such as hydrofluoric acid (or hydrogen fluoride). Coating formulations which are useful for realizing the objects of this invention are set out in Table 1.

TABLE 1

| Coating Solution Solute | Composition of the Coating Prior to Coating Application and Cure (Weight/Percent) | Our formulation Designation |
|---|---|---|
| Sodium Meta Silicate ($Na_2 SiO_3 \cdot 9H_2O$) | 0.5 to 85 in $H_2O$ | SMS-1 |
| Polymethyl siloxane (silicone) | 0.5 to 85 in Toluene, cyclohexane, or chlorinated hydrocarbons or water-solvent emulsion or flame sprayed | PMS-1 |
| Polymethyl vinyl siloxane (silicone) | 0.5 to 85 in Toluene, cyclohexane, or chlorinated hydrocarbons or water-solvent emulsion or flame sprayed | PVS-1 |
| Polyphenyl methyl siloxane (silicone) | 0.5 to 85 (in same, as above) | PPMS-1 |
| Polytetrafluoroethylene | 0.5 to 50 in a water emulsion or applied in a fluidized bed or electrostatic process as neat material, flame sprayed | TFE-1 |
| Polymethylmethacrylate (acrylic) | 0.5 to 85 in ketones, alcohols, freons, glycol ethers (cellusolves, etc.) or chlorinated hydrocarbons (CH)* or as water emulsion | PMMA-1 |
| Polyacrylic acid (acrylic acid) | 0.5 to 85 in Tetrahydrofuran (THF) N,N-Dimethyl formamide (NNDF) as a water solution | PAA-1 |
| Acrylonitrile-butadiene Polystyrene (ABS) | 0.5 to 85 in ketones, cyclohexane, NNDF, THF, or as a water-solvent emulsion | ABS-1 |
| Alkyd Polymers (Alkyl) | 0.5 to 85 in ketones, THF,1,1,1,3,3,3, Hexafluoro-2-propanol (HFP) or as a water-solvent emulsion | AP-1 |
| Polyamides (nylons, nylon 11, nylon 6/6, nylon 6/10, nylon-6, nylon-12) | 0.5 to 85 in NNDF, HFP, THF, toluenes or as a water-solvent emulsion or flame sprayed or fluidized bed or electro-statically coated | PA-1 |
| Polyamides (Vespels) | 0.5 to 85 in NNDF, HFP, THF, toluene, or as a water-solvent emulsion, flame-spray, fluidized bed or electro-statically coated | PI-1 |
| Cellulosic (cellulose nitrate, acetate butyrate, ethyl cellulose modified with urea, alkyd and other resins) | 0.5 to 85 in ketones, esters, aromatic solvents, THF, NNDF, electrostatic powder techniques | C-1 |
| Epoxy polymers (glycidyl ethers of bis-hydroxylphenyl propane catalyzed with mono-, di-, or trifunctional amines or phenolic or amino resins) | 0.5 to 85 in THF, chlorinated hydrocarbons electrostatic or flame spray or fluidized bed | EP-1 |
| Polyfluoroethylene propylene (FEP resins) | 0.5 to 85 in a water emulsion or as a neat solid by high temperature sintering | FEP-1 |
| Unsaturated Polyester (Linear alkyl having carbon to carbon unsaturation) | 0.5 to 85 in ketones, toluene, THF, chlorinated hydrocarbons, or as a water solvent emulsion | UE-1 |
| Polyphenylene sulfide (RYTON) | Fluidized bed, electrostatic spray or flame sprayed | PPS-1 |
| Polyolefins (Polyethylene, polypropylene) | Flame spraying or fusion sintering or as a water suspension emulsion | POE-1 POP-1 |
| Chlorosulfonated polyethylene (HYPALON) | 0.5 to 85 in a water solvent emulsion system | CSPE-1 |
| Polyphenylene Oxides (VALOX) | 0.5 to 85 in NNDF or as a water solvent emulsion or flame sprayed, electro-statically coated, or fluidized bed | PPO-1 |
| Polycarbonates (LEXAN) | 0.5 to 85 in THF, chlorinated hydrocarbons or as a water solvent emulsion | PC-1 |
| Polysulfones | 0.5 to 85 in THF or chlorinated hydrocarbons, flame sprayed or fluidized bed application | PS-1 |
| Polyurethanes (polyether and polyester types) | 0.5 to 85 in Methylene chloride, THF, glycol ethers, toluene, 100% solids spray or a water-solvent emulsion | PUES-1 PUET-1 |
| Sodium Silicate $Na_2O \cdot xSiO_2$ (x = 3–5) | 0.5 to 85 in a water solution of caustic | SS-2 |
| Sodium disilicate $Na_2Si_2O_5$ | 0.5 to 85 in a water solution | SS-3 |
| Sodium orthosilicate $Na_4SiO_4$ | 0.5 to 85 in a water solution of caustic | SS-4 |
| Strontium orthosilicate $SrSiO_4$ | 0.5 to 85 in a water solution of caustic | SS-5 |
| Potassium metasilicate $K_2 Si O_3 \cdot 6H_2O$ | 0.5 to 85 in water solution | WG-1 |
| Potassium tetrasilicate $K_2 Si_4 O \cdot 9H_2O$ | 0.5 to 85 in water | WG-2 |
| Lithium Metasilicate $Li_2SiO_3 \cdot xH_2O$ (x = 1 to n) | 0.5 to 85 in dilute hydrochloric acid | WG-3 |
| Calcium Metasilicate $CaSiO_3 \cdot xH_2O$ (x = 1 to n) | 0.5 to 85 in dilute hydrochloric acid | WG-4 |
| Barium Metasilicate Hydrate ($BaSiO_3 \cdot 6H_2O$) | 0.5 to 85 in water | WG-5 |
| Polyparaxylene | Vapor deposited | PPX-1 |

TABLE 1-continued

| Coating Solution Solute | Composition of the Coating Prior to Coating Application and Cure (Weight/Percent) | Our formulation Designation |
|---|---|---|
| Organo silane compounds (butyl-, tolyl-, properyl or similar analogue types) | 0.5 to 85 in solution of toluene, benzene or dioxane | OS-1 |

Alternatively, the foregoing coating compositions, which are not deemed to be exhaustive, may be filled with various agents to improve the performance of the filter matrix. In Table 2 which follows, preferred fillers for the coating compositions of Table 1 are listed. The compositions of Table 1, or those with the fillers of Table 2 may be used on the filter matrix fibers, or they may be impregnated into the matrix fibers; as to the latter, more follows in the ensuing text.

TABLE 2

| Metal/Non-Metallic Filler* | Range of Compositions | | |
|---|---|---|---|
| | Weight/Percent Composition | Weight/Percent Binder** | Weight/Percent Vehicle |
| Stainless Steel Powder | 0.1 to 25 | 0.3 to 10.0 | 99.6 to 65.0 |
| Silver plated on nickel | 0.1 to 25 | 0.3 to 10.0 | 99.6 to 65.0 |
| Silver plated on carbon | 0.1 to 25 | 0.3 to 10.0 | 99.6 to 65.0 |
| Silver plated on graphite | 0.1 to 25 | 0.3 to 10.0 | 99.6 to 65.0 |
| Iridium plated on graphite | 0.1 to 25 | 0.3 to 10.0 | 99.6 to 65.0 |
| Aluminum-zinc 40:60 | 0.1 to 25 | 0.3 to 10.0 | 99.6 to 65.0 |
| Chromium-nickel 55:45 | 0.1 to 25 | 0.3 to 10.0 | 99.6 to 65.0 |
| Copper chromium 99:1 | 0.1 to 25 | 0.3 to 10.0 | 99.6 to 65.0 |
| INCONEL 600 | 0.1 to 25 | 0.3 to 10.0 | 99.6 to 65.0 |
| Titanium-aluminium 65:35 | 0.1 to 25 | 0.3 to 10.0 | 99.6 to 65.0 |
| Zirconium-nickel 70:30 | 0.1 to 25 | 0.3 to 10.0 | 99.6 to 65.0 |
| Titanium carbide | 0.1 to 25 | 0.3 to 10.0 | 99.6 to 65.0 |
| Noury Ketjen-black-EC(tm) | 0.1 to 25 | 0.3 to 10.0 | 99.6 to 65.0 |
| Boron carbide | 0.1 to 25 | 0.3 to 10.0 | 99.6 to 65.0 |
| Columbium(niobium) carbide | 0.1 to 25 | 0.3 to 10.0 | 99.6 to 65.0 |
| Tantalum carbide | 0.1 to 25 | 0.3 to 10.0 | 99.6 to 65.0 |
| Tungsten-titanium carbide | 0.1 to 25 | 0.3 to 10.0 | 99.6 to 65.0 |
| Zirconium carbide | 0.1 to 25 | 0.3 to 10.0 | 99.6 to 65.0 |
| Petroleum coke base carbon | 0.1 to 25 | 0.3 to 10.0 | 99.6 to 65.0 |
| Anthracite coal base carbon | 0.1 to 25 | 0.3 to 10.0 | 99.6 to 65.0 |
| General purpose industrial grade graphite | 0.1 to 25 | 0.3 to 10.0 | 99.6 to 65.0 |
| Premium grade industrial grade graphite | 0.1 to 25 | 0.3 to 10.0 | 99.6 to 65.0 |
| Carbon-graphite alloys | 0.1 to 25 | 0.3 to 10.0 | 99.6 to 65.0 |
| Recrystallized graphite | 0.1 to 25 | 0.3 to 10.0 | 99.6 to 65.0 |
| Pyrolitic graphite | 0.1 to 25 | 0.3 to 10.0 | 99.6 to 65.0 |
| Highly ordered pyrolitic graphite | 0.1 to 25 | 0.3 to 10.0 | 99.6 to 65.0 |
| Ceylon natural graphite | 0.1 to 25 | 0.3 to 10.0 | 99.6 to 65.0 |
| Madagascar natural graphite | 0.1 to 25 | 0.3 to 10.0 | 99.6 to 65.0 |

TABLE 2-continued

| Metal/Non-Metallic Filler* | Range of Compositions | | |
|---|---|---|---|
| | Weight/Percent Composition | Weight/Percent Binder** | Weight/Percent Vehicle |
| Polyfluorinated graphite intercalates | 0.1 to 25 | 0.3 to 10.0 | 99.6 to 65.0 |
| Solution reacted/reduced molecular sieves*** | 0.1 to 25 | 0.3 to 10.0 | 99.6 to 65.0 |
| Vapor deposited molecular sieves**** | 0.1 to 25 | 0.3 to 10.0 | 99.6 to 65.0 |
| $WF_6$ or $MoFe_6$ graphite intercalates $[C(11 \pm 1)n\ MoFe_6$ and $(C(14 \pm 1)n\ WF_6]$ | 0.1 to 25 | 0.3 to 10.0 | 99.6 to 65.0 |
| Graphite intercalates of nitric acid $[C_{16}\ HNO_3, C_{15}HNO_3, C_{24}/C_{25}\ HNO_3$ or $C_{(8+2x)n}\ N_2O_5 \cdot xH_2O]$ | 0.1 to 25 | 0.3 to 10.0 | 99.6 to 65.0 |
| Graphite intercalates of trifluoromethanesulfonic acid $[C_{26} + CF_3SO_3^- \cdot 1.63\ CF_3SO_3H]$ | 0.1 to 25 | 0.3 to 10.0 | 99.6 to 65.0 |
| Graphite intercalates of sulfuric acid $[C_{24} + HSO_4^- \cdot x\ H_2SO_4$ where $x = 2.37$ to $2.63]$ | 0.1 to 25 | 0.3 to 10.0 | 99.6 to 65.0 |
| Graphite intercalates of metal chlorides [e.g. Cn Fe Cl $Cl_{(3-x)}$, $C_{26}$ Fe $Cl_3$, $C_{24}$ Fe $Cl_2$, where metal chlorides can be $MoCl_5$, $MnCl_2$, $FeCl_3$, $FeCl_2$, $CoCl_2$, $NiCl_2$, $CuCl_2]$ | 0.1 to 25 | 0.3 to 10.0 | 99.6 to 65.0 |
| Graphite intercalates of alkali metals and metal chloride solvent complexes $[Li_3CmFeCl_3$ (Tetrahydrofuran)$_3]$ | 0.1 to 25 | 0.3 to 10.0 | 99.6 to 65.0 |
| Graphite intercalates of mixed metal chlorides and bromides $[C_{13.2}\ Tl\ Cl_{1.8}\ Br_{1.7}, C_{30}\ Tl\ Br\ 3.4]$ | 0.1 to 25 | 0.3 to 10.0 | 99.6 to 65.0 |
| Graphite intercalates of metal bromides $[C_{25.3}\ Tl\ Br_{3.2} \cdot Br_2—TlBr_3$, where other metal bromides may be Cd $Br_2$, Hg $Br_2$ Al $Br_3$ and Ga $Br_3]$ | 0.1 to 25 | 0.3 to 10.0 | 99.6 to 65.0 |
| Graphite intercalates of alkali metals and benzene $[MC_{24}(C_6H_6)x$ or $K_{24}(C_6H_6)x]$ | 0.1 to 25 | 0.3 to 10.0 | 99.6 to 65.0 |
| Simple graphite intercalates of alkali metals $[LiC_6, KC_8, RbC_8,$ etc. or $KC_{24}, LiC_{12}, KC_{36}]$ | 0.1 to 25 | 0.3 to 10.0 | 99.6 to 65.0 |
| Graphite intercalates of boron trifluoride $[Cn-OC_2H_5 \cdot xBF_3]$ | 0.1 to 25 | 0.3 to 10.0 | 99.6 to 65.0 |
| Graphite-antimony pentafluoride intercalate $[Cx \cdot SbF_5]$ | 0.1 to 25 | 0.3 to 10.0 | 99.6 to 65.0 |
| Layer intercalated dicholcoginides | | | |

TABLE 2-continued

| Metal/Non-Metallic Filler* | Range of Compositions | | |
|---|---|---|---|
| | Weight/Percent Composition | Weight/Percent Binder** | Weight/Percent Vehicle |
| [LlTiS$_2$, TaCs(NH$_3$)] MoS$_2$ intercalation compounds [AxMoS$_2$ where A = Na, K, Rb, Cs, Ca, and Sr] Metal oxide lamellar intercalation compounds [AxMo$_2$ where A = Na, K, etc. and M = Cr, Mn, Co] | 0.1 to 25 | 0.3 to 10.0 | 99.6 to 65.0 |
| | 0.1 to 25 | 0.3 to 10.0 | 99.6 to 65.0 |
| | 0.1 to 25 | 0.3 to 1.0 | 99.6 to 65.0 |

*600 mesh or smaller particle size
**based on solids content
***reacted with salt of nickel, gold, platinum, paladium, iridium, silver, or alloys of each
****Nobel metals, silver, or alloys of each.

Since most coatings or impregnant must be processed onto or into the filter media, a vehicle, such as a solvent, must be used to allow the coating to form a homogeneous film or to penetrate the filter media fibers. Table 3 lists preferred vehicles.

TABLE 3

H$_2$O
H$_2$O/NaOH, Ca(OH)$_2$, KOH
N$_2$H$_4$/H$_2$O
Isopropanol (IPA)
Isopropanol and water (IPA + H$_2$O)
Tetrahydrofuran (THF)
N,N'-dimethyl formamide (NNDF)
Acetone (ACE)
Methyl ethyl ketone (MEK)
Freon solvents (FR)
Carbitol ⎫
Cellosolve ⎬ polyglycol ethers
Propasol ⎭
Methyl isobutyl ketone (MIBK)
Methylene chloride (MC)
2,2,2 Trifluoroethanol (2-TFE)
1,1,1,3,3,3, Hexafluoro-2-propanol (1-3-HFP)
Cyclohexane (CH)
H$_2$O + anionic and/or cationic surfactants (HS)
Toluene (Tol)
Benzene (Ben)
Methanol (M)
Ethanol (E)

Accordingly, a typical coating formulation containing a "binder" (from Table 1), a vehicle (i.e. Table 3), or a filler agent (from Table 2) may be applied to, or impregnated into matrix fibers, to impart the inventive properties thereto, and yield the improved filter, and such typical formulations are set out in Table 4.

TABLE 4

| Formulation Number | Filler* | | Binder* | | Vehicle*** | | Surfactants | |
|---|---|---|---|---|---|---|---|---|
| | Type | Wt. % | Type | Wt. %* | Type | Wt. % | Type | Wt. % |
| 1 | Ti C | 15.0 | PMMA-1 | 7.0 | IPA | 85.0 | — | — |
| 2 | Graphite*** | 6.0 | PMMA-1 | 6.8 | MC | 94.0 | — | — |
| 3 | BaC** | 11.0 | SMS-1 | 5.0 | H$_2$O/NaOH | 89.0 | SF1066**** | 0.01 |
| 4 | Stainless Steel** | 2.0 | PA-1 | 25.0 | NNDF | 98.0 | — | — |
| 5 | Silver on graphite** | 25 | EP-1 | 10.0 | THF | 75 | — | — |
| 6 | Polyfluorinated graphite intercalate*** | 20 | TFE | 80 | (none) | | (flame sprays after cold blending with sintering at 500° F.) | |
| 7 | KC$_{24}$(C$_6$H$_6$)x | | TFE and graphite | 35 | Freon-111 | 65 | — | — |
| 8 | Cx . SbF$_5$ | | TFE and graphite | 10 | Freon-111 | 90 | — | — |
| 9 | Li$_3$CnFeCl$_3$ (tetramethylene oxide) | | TFE and graphite | 30 | THF | 70 | — | — |
| 10 | C$_{13.2}$TlCl$_{1.8}$Br$_{1.7}$ | | TFE and graphite | 25 | Freon 111 | 75 | — | — |

*Based on solids content after vehicle evaporation
**600 mesh or less, dried
***Northern Michigan or Canadian graphite highly ordered or pyrolytic graphite - 1000 mesh or less
*see Table 2
**see Table 1
***see Table 3 (the term "vehicle" is the terminology for a solvent or solvent mixture that allows film formation in a coating by evaporative loss cross-linking, or emulsion formation)
****trademark of the General Electric Co., for its polyalkylene glycol siloxane Formulations numbers No. 1 through No. 5 are intended for purposes of accomodating gas stream component release, as priorly described. Formulation No. 2 and other polytetrafluoroethylene (Table 1) and polyfluoroethylene propylene unfilled coatings impart "self-cleaning" and corrosion protection, while formulations No. 6 through No. 10, as well as graphite intercalates of boron trifluoride act a gettering agents (e.g. polymerization of polyvinyl chloride monomer to a polymerized state to remove the monomer from a process gas stream).

The media of the filter matrix to be coated can be made from treated cellulostics, glass, pyroceramic or ceramic fibers, minerals of various types, metals or preoxidizing or calorized or plated metals, polymeric materials and polymer composites, as described previously, or natural fibers, such as cotton, wool, etc.

In our preferred embodiment, the matrix is prepared from a filter media material comprising a compound of polyethylene and ketjenblack-EC (the trademark for an electrical conductive carbon black manufactured by the Noury Chemical Company, New York).

Typically, the constituent elements are cold blended and extruded into fibers, or formed by explosive reticulation techniques. The extruded or otherwise formed fibers are then woven, compressed or hand layed-up onto a desired filter configuration. Simply by adjusting the amount of fiber "filler", i.e., the ketjenblack-EC, it is possible to alter the component (i.e. to-be-filtered-out particles, etc.)-to-media adhesion. That is, differences in the net component (particle)-media volume resistivity, and the net overall volume resistivity of the media surface and/or the fibers, to determine the amount of energy which will be required to break or neutralize the forces of attraction between the components (particles) and media, can be effected by the filler content. Ketjenblack-EC is but one filler which may be used for this purpose, and is mentioned, here, only for exemplary purposes. Other suitable fillers are listed in Table 2.

As noted priorly, various polymeric materials may be used as filter media fibers or material. Table 5 lists polymeric materials that may act as filter media matrices for which other and various fillers are added to alter the properties of the media.

TABLE 5

| Generic name | Common name |
| --- | --- |
| Polymethyl siloxane | silicone |
| Polymethyl vinyl siloxane | silicone |
| Polyphenyl methyl siloxane | silicone |
| Polytetrafluoroethylene | Teflon (tm, DuPont), TFE |
| Polymethylmethacrylate | Lucite (tm. DuPont) acrylic |
| Polyacrylic acids | — |
| Acrylonitrile-butadiene polystyrene | ABS |
| Alkyd polymers | alkyds |
| Polyamides | Nylon 6, 6/6, 11, 12, 6/10 |
| Polyimides | Vespel (tm, DuPont) |
| Polyamide-imides | Torlon (tm, Amoco Chemical) |
| Cellulosics | cellulose nitrate, - acetate butyrate, ethyl cellulose modified with urea, alkyd, and other resins |
| Epoxy polymers | glycidyl ethers of bis-hydroxy phenyl propane catalyzed with mono-, di-, or trifunctional amines or phenolic or amino resins |
| Polyfluoroethylene propylene | FEP resins (DuPont) |
| Unsaturated polyester polymers | Linear alkyd having carbon to carbon unsaturation |
| Polyphenylene sulfide | RYTON (Phillips Petroleum) |
| Polyolefins | polyethylene, polypropylene etc. |
| Chlorosulfonated polyethylene | HYPALON (DuPont) |
| Polyphenylene oxide polymers | VALOX (G.E.) |
| Polycarbonate polymers | LEXAN (G.E.) |
| Polysulfones | — |
| Polyarylsulfones | — |
| Polyurethane | polyester or polyether types mono-methyl- or trimethyl diisocegente |
| Polyparaxylene | PARALIN |

These polymeric materials may also contain filler agents which will modify their physical properties in such a fashion as to control gas stream component impaction-retention, modify surface specific resistivity, and provide a relatively easy means for component release from the filter matrix with the introduction of mechanical, or other, energy forms. Filler agents for the listed polymeric materials, and concentration ranges therefor, are listed in Table 6.

TABLE 6

| Metal/Non-Metallic Filler** | Filler (phr)* | Binder or Matrix (phr) |
| --- | --- | --- |
| Stainless steel powder, type 300 & 400 series, 17-4 PH etc. | 1.0 to 350 | 100 |
| Silver plated nickel (6 to 20 wt.% silver on nickel) | 1.0 to 350 | 100 |
| Silver plated carbon (1 to 13 wt.% silver on carbon) | 1.0 to 350 | 100 |
| Silver plated graphite (1 to 16 wt.% silver on graphite; see Table 2 for types of graphite) | 1.0 to 350 | 100 |
| Iridium plated graphite (0.5 to 6 wt.% silver on graphite; see Table 2 for types of graphite) | 1.0 to 350 | 100 |
| Aluminum-zinc (40:60) | 1.0 to 350 | 100 |
| Chromium-nickel (55:45) | 1.0 to 350 | 100 |
| Copper-chromium (99:1) | 1.0 to 350 | 100 |
| INCONEL 600 (registered trade mark for an austenitic high nickel alloy manufactured by the International Nickel Corp., Tuxedo, New York) | 1.0 to 350 | 100 |
| Titanium aluminum (65:35) | 1.0 to 350 | 100 |
| Zirconium nickel (70:30) | 1.0 to 350 | 100 |
| Titanium carbide | 1.0 to 350 | 100 |
| Noury ketjenblack-EC$^{(tm)}$ | 1.0 to 350 | 100 |
| Boron carbide | 1.0 to 350 | 100 |
| Columbium (niobium) carbide | 1.0 to 350 | 100 |
| Tantalum carbide | 1.0 to 350 | 100 |
| Tungsten titanium carbide | 1.0 to 350 | 100 |
| Zirconium carbide | 1.0 to 350 | 100 |
| Petroleum coke base carbon | 1.0 to 350 | 100 |
| Anthracite coal base carbon | 1.0 to 350 | 100 |
| General purpose industrial grade graphite | 1.0 to 350 | 100 |
| Carbon-graphite alloys | 1.0 to 350 | 100 |
| Premium grade industrial grade graphite | 1.0 to 350 | 100 |
| Recrystallized graphite | 1.0 to 350 | 100 |
| Pyrolitic graphite | 1.0 to 350 | 100 |
| Highly ordered pyrolytic graphite (HOPG) | 1.0 to 350 | 100 |
| Ceylon natural graphite | 1.0 to 350 | 100 |
| Madagascar natural graphite | 1.0 to 350 | 100 |
| Polyfluorinated graphite intercalates | 1.0 to 350 | 100 |
| Solution reacted/reduced*** molecular sieves (1Å to 20Å pore sizes) | 1.0 to 350 | 100 |
| Vapor deposited molecular sieves (1Å to 20Å pore sizes) | 1.0 to 350 | 100 |
| $C_{(1.1 \pm 1)n}$ MoF$_6$ or $C_{(14 \pm 1)n}$ WF$_6$ graphite intercalates | 1.0 to 350 | 100 |
| Graphite intercalates of nitric acid (see Table 2) | 1.0 to 350 | 100 |
| Graphite intercalates of trifluoromethanesulfonic acid (See Table 2) | 1.0 to 350 | 100 |
| Graphite intercalates of sulfuric acid (see Table 2) | 1.0 to 350 | 100 |
| Graphite intercalates of metal chlorides (see Table 2) | 1.0 to 350 | 100 |
| Graphite intercalates of alkali metals and metal chloride solvent complexes (see Table 2) | 1.0 to 350 | 100 |
| Graphite intercalates of mixed metal chlorides and bromides (see Table 2) | 1.0 to 350 | 100 |
| Graphite intercalates of metal bromides (see Table 2) | 1.0 to 350 | 100 |
| Graphite intercalates of alkali metals and benzene (see Table 2) | 1.0 to 350 | 100 |
| Simple graphite intercalates of alkali metals (see Table 2) | 1.0 to 350 | 100 |
| Graphite intercalates of boron trifluoride (see Table 2) | 1.0 to 350 | 100 |
| Graphite antimony penta-fluoride intercalates (see Table 2) | 1.0 to 350 | 100 |
| Layer intercalated dihalcogenides (see Table 2) | 1.0 to 350 | 100 |
| MoS$_2$ intercalation compounds (see Table 2) | 1.0 to 350 | 100 |
| Metal oxide lamellar intercalations (see Table 2) | 1.0 to 350 | 100 |

*phr: parts per hundred resin or polymer binder.

The invention teaches an improvement of existing fluid filters, even the more efficient thereof which comprise particulate removal of 99.97% of all particles down to 0.3 microns, and where the filtration mechanism is any one or combination of the following: entrainment by impaction retention, impingement, and/or electro-static attraction. It is a known engineering and industrial practical fact that highly efficient fluid filters will eventually become blinded or inoperative, where blinding is defined as a pressure drop of 5 to 15 inches of water with an air flow of 1000 cfm over a filter face area of 500 in.$^2$. With a pressure drop from initial unrestricted flow, the filter will block an air stream, cause abnormal resistance and, if the air pressure is maintained, the filter media will rupture. At this point, no means can be used to reclaim the filter because of irreversible damage having occurred to the filter media.

The invention discloses an improved fluid filter which is rendered reusable, after blinding thereof, by the coating or impregnation of the filter media with a series of specific coating formulations or by fabricating a filter from a specific series of formulated materials in various configurations, variations, and compositions so as to permit the filter to be cleaned and reused at an improved pressure condition of no less than 50% of its final, used pressure drop (e.g., initial pressure drop of two inches of water; used pressure drop of 12 inches of water; cleaned pressure drop of 2 to 6 inches of water). The herein disclosed improved filter is so constructed that, by adding energy thereto in the form of mechanical impaction, ultrasonic or mechanical vibration, reverse air flow at pressures of 0.1 to 5 atmospheres, or vacuums from either the inlet or outlet sides of the filter at 0.5 atmospheres to 1 times $10^{-6}$ torr, the attractive force of the entrained particle will be neutralized and the particle will be released from the filter media.

In order to accomplish this, the filter media must be chemically and physically modified to create a balance between the energy of the entrained particle and the filter media. If this is not done, the "added energy" of the cleaning processes noted will cause the particle to release so as to damage the filter media, since excess energy will cause media rupture. The improved filter, according to the disclosed invention, is formed by coating or impregnation of the media with the formulations listed in Table 1, Table 2, where the selected vehicles for the coatings are listed in Table 3. Some preferred formulations are found in Table 4.

What is especially to be noted is this, that the coating(s) alter the original or base filter media by strengthening, and this is established by an increase in the tensile strength thereof, or percent of elongation, or abrasion resistance, or tear strength.

In summary, the novel, improved fluid filter comprises a coating which comprises a polymeric binder with its appropriate solvent vehicle, and fillers and extenders which are added to the polymeric binder. These coatings add strength and toughness to the filter media, alter the volume resistivity of the media by making it more electrically conductive or protects the media from corrosive attack.

The teaching of this invention comprises the formulation of the filter media from fibers, mattes, agglomerates, fiber overlays, woven fibers, entangled masses recticulated structures, porous sinters or frits, at no greater than seventy percent theoretical density, which have been specially formulated with additives to cause the filter media to perform like the coated fibers priorly discussed and described.

To revert to the before-described process of forming the novel filter, and curing technique therefor, the practice is modified wherein the filter matrix comprises the natural fibers (cotton, wool, and the like). Rather than the excessive heat of 250° F., the natural-fibered matrixes are air dried at approximately 150° F. for approximately thirty-six to forty-eight hours.

Among the matrixes formed for use as filter media, according to our invention, are those made of fine-wire meshes and needle-punched, porous polymer-film-plies which are interleaved with nylon mesh. Surely, other media materials and compositions will occur to those skilled in this art, by taking teaching from our disclosure. However, all derivations are deemed to be within the ambit of our disclosure and comprised by our claims. Thus, while we have described our invention in connection with specific embodiments thereof, it is to be clearly understood that this is done only by way of example, and not as a limitation to the scope of our invention, as set forth in the objects thereof and in the appended claims.

We claim:

1. An improved, regenerative fluid filter, for removing components such as sublimated solids, particulate materials, particulate-aerosol combinants, and the like, from gas streams, said filter having a matrix formed from at least one material taken from a group of materials consisting of metal, and natural fibers such as cotton, wool, linen, flax and the like, wherein the improvement comprises:
   at least one means mated to said matrix material for hardening, strengthening, and toughening said matrix material, for enhancing components-release from said filter, whereby said filter is rendered readily regenerative; and wherein
   said means mated to said matrix comprises a coating and a filler agent.

2. An improved filter, according to claim 1, wherein:
   said coating comprises means for altering the physical properties of the surface of said matrix material, to reduce impaction-retention of said components by said matrix material.

3. An improved filter, according to claim 1, wherein:
   said coating comprises means for reducing electro-static attraction of said matrix material for said components.

4. An improved filter, according to claim 1, wherein:
   said coating comprises means for increasing diffusion capacity of said matrix material.

5. An improved filter, according to claim 1, wherein:
   said matrix material comprises a filter media formed of one of said fibers; and
   said coating comprises a composition of graphite powders and plastic.

6. An improved filter, according to claim 5, wherein:
   said composition comprises a fiber-encasing film having a thickness within a range of approximately 10 to 1000 micro-inches.

7. An improved filter, according to claim 1, wherein:
   said coating comprises means for imparting corrosion protection to said filter matrix.

8. An improved filter, according to claim 1, wherein:
   said filler agent comprises a graphite intercalate; and
   said graphite intercalate defines means for gettering carcinogenic and like harmful vapors and/or particulates borne by said gas streams by altering said carcinogenic and like vapors and/or particulates chemical reactivity or by changing the chemical structure thereof.

9. An improved filter, according to claim 1, wherein:
   said filler agent comprises means for gettering carcinogenic and like harmful vapors and/or particulates borne by said gas streams by altering said carcinogenic and like vapors and/or particulates chemical reactivity or by changing the chemical structure thereof.

* * * * *